July 7, 1964 F. L. H. M. STUMPERS ETAL 3,140,351

ARRANGEMENT FOR THE STEREOPHONIC TRANSMISSION OF SIGNALS

Filed May 26, 1961

INVENTORS
FRANS L.H.M. STUMPERS.
RUDOLF SCHUTTE.
BY
AGENT

United States Patent Office 3,140,351
Patented July 7, 1964

3,140,351
ARRANGEMENT FOR THE STEREOPHONIC TRANSMISSION OF SIGNALS

Frans Louis Henri Marie Stumpers and Rudolf Schutte, Eindhoven, Netherlands, assignors to North American Philips Company, Inc., New York, N.Y., a corporation of Delaware Filed May 26, 1961, Ser. No. 112,878
Claims priority, application Netherlands June 27, 1960
8 Claims. (Cl. 179—15)

Figure 1:
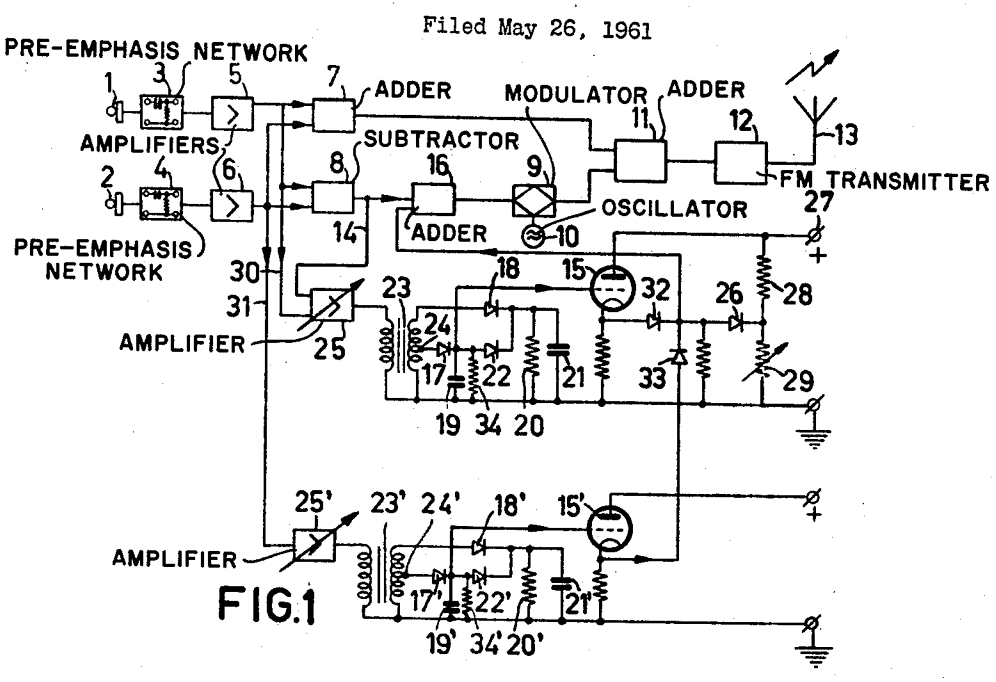

This invention relates to transmitting arrangements comprising an amplitude modulator stage controlled by the signals to be transmitted and a carrier oscillation, more particularly for signals modulated on an auxiliary carrier frequency, and also comprising a control-voltage generator, controlled by the signals to be transmitted, for producing a control voltage dependent upon the peak value of the signals to be transmitted and varying the value of the co-transmitted carrier oscillation by the peak value of the signals to be transmitted.

Amplitude-modulated transmitting arrangements of the said kind have the advantage of a considerable saving of energy and a reduced interference on the emission of transmitters adjacent in frequency, but special steps are required for realizing a signal transmission of high reproduction quality, since frequency components of the control voltage which are located in the transmission band must occur only with a considerable degree of attenuation. In transmitting devices with an amplitude-modulated auxiliary carrier oscillation, more particularly for stereophonic transmission, wherein the sum signal $A+B$ of the coherent stereophonic signals A and B and the difference signal $A-B$, modulated on an auxiliary carrier frequency, are supplied as a modulating voltage to an FM-transmitter, it is necessary not only that no more auxiliary carrier is transmitted than is required for satisfactory operation of the coacting receivers, but also for improving their insensitivity to interference from frequency-adjacent transmitters that the unmodulated auxiliary carrier is suppressed as rapidly as possible during the intervals between transmissions, since the sensitivity to interference of the receivers is considerably increased by the reduced frequency distance between the auxiliary carrier frequency and the frequencies of adjacent transmitters.

An object of the invention is to provide a transmitting arrangement of the said kind, more particularly for signals transmitted on an auxiliary carrier frequency, in which the above-mentioned requirements for signal transmission of excellent quality are fulfilled in an elegant manner with a simple structure.

An arrangement according to the invention is characterized in that the control-voltage generator comprises two rectifying stages, fed by the signals to be transmitted and each having an associated smoothing filter of a different time-constant, the input voltage applied to the rectifying stage comprising the smoothing filter of the greater time-constant (first rectifying stage) being smaller than that applied to the rectifying stage comprising the smoothing filter of the smaller time-constant (second rectifying stage), and that a rectifier is included between the two smoothing filters and released only if the output voltage of the second rectifying stage drops below the output voltage of the first rectifying stage, the output voltage of the control-voltage generator being derived from the smoothing filter of the first rectifying stage.

Figure 2:
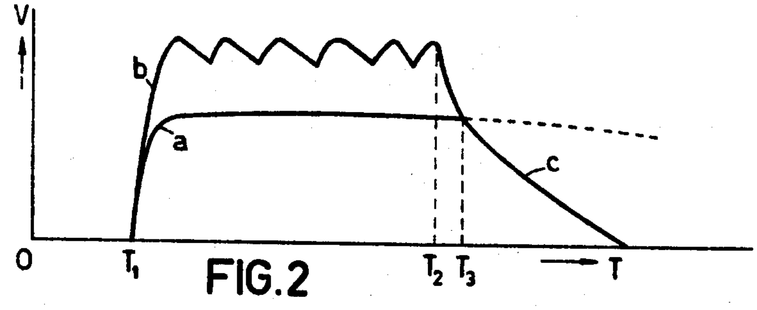
Figure 3:
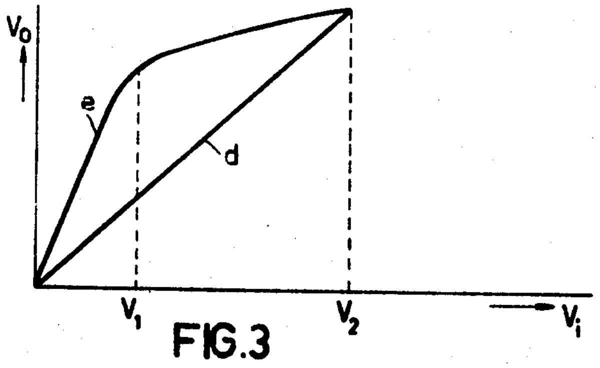

In order that the invention may be readily carried into effect, it will now be described in detail, by way of example, with reference to the accompanying diagrammatic drawing, in which:

FIGURE 1 shows a stereophonic transmitting arrangement according to the invention, whilst FIGURE 2 shows a time diagram and FIGURE 3 a voltage diagram to explain the arrangement of FIGURE 1.

The transmitting arrangement shown in FIGURE 1 is designed for the transmission of stereophonic signals transmitted on the same carrier frequency as frequency modulation and comprising the sum signal $A+B$ of the coherent stereophonic signals A and B and an auxiliary carrier frequency modulated in amplitude by the difference signal $A-B$.

In the transmitting arrangement shown, the coherent stereophonic signals A and B originating from two microphones 1 and 2 are supplied via pre-emphasis networks 3 and 4 to pre-amplifying stages 5 and 6, the output circuits of which are connected to a sum producer 7 and a difference producer 8, respectively, for obtaining the sum signal $A+B$ and the difference signal $A-B$. The low-frequency signals originating from the two microphones 1 and 2 are located, for example, in the frequency band of from 30 to 15,000 c./s.

In the arrangement shown, the difference signal $A-B$, derived from the output circuit of the difference producer 8, is modulated in amplitude on an auxiliary carrier oscillation from an auxiliary carrier oscillator 10 having a frequency of, for example 35 kc./s. in an amplitude modulator 9 and combined with the sum signal $A+B$ in a device 11, the resulting signal, located in the band of from 30 to 50,000 c./s., forming the modulating voltage of an FM-transmitter 12, shown diagrammatically, which is connected to a transmitting aerial 13. For example, the carrier frequency of 100 mc./s. emitted by the FM-transmitter 12 is modulated in frequency with a sweep of 75 kc./s. by the modulating signal located in the band from 30 to 50,000 c./s.

In order to improve the transmitting properties of the arrangement which so far described is known, this transmitting arrangement comprises a control voltage generator, which is connected to the output circuit of the difference producer 8 as shown by a broken line 14, for producing a control voltage which varies with the peak value of the difference signal and which in turn varies the co-emitted auxiliary carrier oscillation by the peak value of the difference signal $A-B$. For this purpose the output voltage of the control-voltage generator is combined with the difference signal, via a cathode amplifier 15, in a device 16 located between the difference producer 8 and the modulator 9 and supplied as a modulating voltage to the amplitude modulator 9 which is balanced for the auxiliary carrier oscillation. In the absence of a difference signal and hence in the absence of a control voltage, the auxiliary carrier oscillation is thus suppressed by the push-pull action of the balanced modulator, whereas in the presence of a difference signal the auxiliary carrier oscillation transmitted varies substantially in proportion to the control voltage. If desired, this amplitude control of the auxiliary carrier oscillation as a function of the peak value of the difference signal may alternatively be effected in a different manner, for example by controlling the output voltage of the auxiliary oscillator 10 as such by the control voltage.

In order to raise the transmission properties to an optimum value with this amplitude control of the co-transmitted auxiliary carrier oscillation, the control-voltage generator comprises two rectifying stages fed by the signals to be transmitted, comprising rectifiers 17, 18 each having associated with it a smoothing filter of a different time-constant, these smoothing filters in the embodiment shown being constituted by a smoothing capacitor 19, bridged by a very large leak resistor 34, and a smoothing capacitor 21, bridged by a comparatively small leak resistor 20, and more particularly the smoothing filter 19, 34 associated with the rectifying stage 17 having a time-constant considerably greater than one cycle of the lowest signal frequency of 30 c./s. to be transmitted, for example a time-constant of 2.5 seconds, whereas the time-constant of the smoothing filter 20, 21 is considerably smaller, for example smaller by a factor 30. The input voltage applied to the rectifying stage 17 comprising the smoothing filter 19, 34 of the greater time-constant is smaller than that applied to the rectifying stage 18 comprising the smoothing filter 20, 21 of the smaller time-constant, a rectifier 22 being included between the two smoothing filters 19, 34 and 20, 21 and having a pass direction such as to be released only if the output voltage of the second rectifying stage 18 drops below the output voltage of the first rectifying stage 17, whilst the output voltage of the control-voltage generator is derived from the smoothing filter 19, 34 of the first rectifying stage 17. In the embodiment shown, the input voltage is applied to the rectifying stage 18 via a transformer 23 and the rectifying stage 17 is connected to a tapping 24 on the secondary winding so as always to fulfill the requirement that the input voltage applied to the rectifying stage 17 is smaller than that applied to the rectifying stage 18, for example 85% of the input voltage of the rectifying stage 18.

The operation of the device so far described will now be explained with reference to the time diagram shown in FIGURE 2.

Starting from the condition that signals are not transmitted by the transmitter at the moment $T=0$, a control voltage is not produced by the control-voltage generator and hence an auxiliary carrier oscillation is not emitted by the modulator stage 9.

Let it be assumed that signals are supplied to the microphones 1 and 2 at the moment $T_1$, then the smoothing capacitors 19, 21 of the two rectifying stages 17, 18 are rapidly charged by way of the rectifiers, then conducting, to the peak value of the transmitted signals at a charging rate determined by the charging time-constants of the capacitors 19, 21, which are smaller than one cycle of the highest signal frequency to be transmitted in order to ensure that an auxiliary carrier oscillation of sufficiently great amplitude is immediately available. Voltages as indicated by curves *a* and *b* are thus set up across the smoothing filters 19, 34 and 20, 21 of the rectifying stages 17 and 18, the rectifier 22 being blocked for the indicated pass direction, so that the control voltage applied to the modulator stage 9 is represented by curve *a* which also shows the amplitude variation of the auxiliary carrier oscillation transmitted by the modulator stage.

While the output voltage of the rectifying stage 18 still shows considerable variations in amplitude in view of the comparatively small time-constant of the smoothing filter 20, 21, the amplitude variations in the output voltage of the rectifying stage 17 are considerably reduced and more particularly it is ensured by the aforementioned great time-constant of the smoothing filter 19, 34 that frequency components occur in the transmission band only with a considerable degree of attenuation. Optimum quality of reproduction is thus ensured when listening to signals emitted by the transmitting arrangement.

When a transmission interval occurs at the moment $T_2$, the voltage across the capacitor 21 of the rectifying stage 18 decreases more rapidly than does the voltage across the capacitor 19 in view of its comparatively small time-constant, whereby at the moment $T_3$, when the voltage of capacitor 21 passes that of capacitor 19, the rectifier 22 located between the two smoothing filters 19, 34 and 20, 21 becomes conducting, whereupon the capacitor 19 can rapidly discharge through the smoothing filter 20, 21 of considerably smaller time-constant associated with rectifying stage 18. This discharge of capacitor 19 takes place, for example, in the manner indicated by curve *c* in FIGURE 2. Upon a transmission interval, the auxiliary carrier oscillation transmitted by the modulator 9 thus rapidly decreases according to curve *c*, resulting in the input side being much more insensitive to interference from signals originating from adjacent transmitters, which signals together with the unmodulated auxiliary carried oscillation would otherwise give rise to interference signals in the transmission band during the speech intervals. In addition to the excellent quality of reproduction and the high insensitivity to interference, the use of the described arrangement is particularly attractive in practice owing to its simple structure and little critical adjustment.

In order to obtain an optimum quality of transmission, for example, to ensure a sufficiently large auxiliary carrier oscillation, it has been found advantageous for the amplitude of the auxiliary carrier oscillation transmitted by the modulator stage 9 to increase more rapidly for a small signal amplitude than do the signals to be transmitted, as shown in the voltage diagram of FIGURE 3, wherein the output voltage of a modulator stage $V_0$ is plotted as a function of an input signal voltage $V_i$. When in this figure the line *d* indicates the dependency between the input voltage and the output voltage relative to the signals to be transmitted, the curve *e* indicates the variation in amplitude of the auxiliary carrier oscillation transmitted, which increases rapidly for a small voltage of the input signal up to a given value $V_1$ of the input signal voltage, and then increases slowly beyond the value $V_1$ of input signal until the curve *e* intersects the line *d* at the maximum voltage $V_2$ of the input signal. More particularly the increase of the transmitted auxiliary carrier for a small voltage of the input signal is controlled by means of an input amplifier 25, and the bending of curve *e* at the value $V_1$ is brought about by connecting a limiter to the output circuit of the control-voltage generator. In the embodiment shown, this limiter comprises a rectifier 26 to which a suitable bias is applied by means of a voltage divider 28, 29 included between a supply voltage terminal 27 and earth. Both the increase of the auxiliary carrier oscillation for a small signal voltage and the bending point $V_1$ may be adjusted at will by using, respectively, an amplifier having an adjustable gain factor and an adjustable limiter, which may be obtained in a simple manner by making one resistor of the voltage-divider 28, 29 adjustable.

In an arrangement of the specified type which has been extensively tested in practice, the following components were employed:

| | |
|---|---|
| Rectifiers **17**, **18**, **22** | OA 200, OA 5, OA 200. |
| Capacitor **19** | 0.047 $\mu$f. |
| Capacitor **21** | 0.150 $\mu$f. |
| Resistor **34** | 50 megohms. |
| Resistor **20** | 0.47 megohm. |

Transformation ratio of the transformer 23 is 23:1.

In the further elaboration of an arrangement according to the invention, the transmitting arrangement shown is matched to the design of the particularly advantageous stereophonic receiver described in the copending patent application Serial No. 16,214, filed March 21, 1960, now Patent No. 3,087,994, that is to say for obtaining an optimum quality of transmission when using the stereophonic receiver described therein. As explained more fully in the copending patent application, the coherent stereophonic signals A and B are restored from the detected modulating voltage comprising the sum signal $A+B$ and the difference signal $A-B$, modulated in amplitude on the auxiliary carrier oscillation, by applying the detected modulating voltage to two oppositely connected amplitude-detecting devices, the coherent stereophonic signals A and B being derived from the output circuits of the amplitude-detecting devices. In order to realize an optimum quality of transmission when using this stereophonic receiver, which is attractive in technical respect, it is desirable that the amplitude of the auxiliary carrier oscillations be at least as great as the greater of the two coherent stereophonic signals A and B.

This requirement for an optimum quality of transmission is fulfilled in the described transmitting arrangement by using a second control-voltage generator, the structure of which is identical with that of the control-voltage generator previously described. Corresponding elements are indicated by the same reference numerals, but primed for the sake of distinction.

The control-voltage generators are controlled directly by the coherent stereophonic signals A and B by connecting the input circuits of amplifiers 25, 25′ via conductors 30, 31 directly to the output circuits of the preamplifiers 5, 6 and relatively comparing the output voltages of the two control-voltage generators, derived from cathode amplifiers 15, 15′, in an amplitude-comparison stage, which, in the described embodiment, is constituted by rectifiers 32 and 33. If the greater stereophonic signal occurs, for example, at the microphone 1, the rectifier 32 is released and the rectifier 33 is blocked, whereas if the greater stereophonic signal occurs at the microphone 2, the rectifier 33 is released and the rectifier 32 is blocked.

It is thus ensured that the described transmitting arrangement transmits an auxiliary carrier oscillation having an amplitude at least as great as the greater of the two stereophonic signals, thus resulting in an optimum quality of transmission, as previously explained.

What is claimed is:

1. A transmitting system comprising a source of modulation signals, a source of oscillations, amplitude modulation means for modulating said oscillations with said modulation signals to provide output oscillations, a control voltage generator for providing a control voltage, and means connected to said control voltage generator for varying the amplitude of said output oscillations as a function of the amplitude of said control voltage, said control voltage generator comprising first and second rectifying stages having first and second filters respectively, said first filter having a greater time constant than said second filter, means applying said modulation signals to said first rectifying stages whereby modulation signals applied to said first rectifying stage have a smaller amplitude than modulation signals applied to said second rectifying stage, rectifier means connected between said first and second rectifying stages with a polarity to conduct only when the output voltage of said second rectifying stage is of smaller amplitude than the output voltage of said first rectifying stage, and means for deriving said control voltage from said first rectifying stage.

2. A transmitting system comprising a source of modulation signals, a source of oscillations, amplitude modulater means for amplitude modulating said oscillations with said signals to provide output oscillations, and means for varying the amplitude of said output oscillations as a function of the peak value of said modulation signals, said means for varying said output oscillations comprising control voltage generator means for providing a control voltage that varies as a function of the peak value of said signals, and means connected to said control voltage generator for varying the amplitude of said output oscillations as a function of said control voltage, said control voltage generator comprising first and second rectifier means, means for applying said signals with different amplitudes to said rectifier means whereby a higher amplitude signal is applied to said second rectifier means than to said first rectifier means, first and second filter means connected to the outputs of said first and second rectifier means respectively, said first filter means having a greater time constant than said second rectifier means, third rectifier means connected between said first and second filter means with a polarity to conduct only when the amplitude of voltage at said second filter means is less than the amplitude of voltage at said first filter means, and means for deriving said control voltage from said first filter means.

3. A transmitting system comprising a source of modulation signals, a source of carrier oscillations, means for amplitude modulating said carrier oscillations with said modulation signals to provide output oscillations, means for providing a control voltage dependent upon the peak value of said signals, and means responsive to said control voltage for varying the amplitude of said output oscillations with the amplitude of said control voltage, said means providing a control voltage comprising first and second rectifier stages having first and second filter means respectively, said first filter means having a longer time constant than said second filter means, means applying said modulation signals to said first and second rectifier stages with a greater amplitude of signals being applied to said second rectifier stage than said first rectifier stage, rectifier means interconnecting said first and second rectifier stages with a polarity to conduct only when the amplitude of rectified voltage in said second rectifier stage is less than the amplitude of rectified voltage in said first rectifier stage, means deriving said control voltage from said first rectifier stage, whereby the amplitude of said control voltage is dependent upon the rectified voltage of said first and second stages having the least amplitude, and means applying said control voltage to said means for varying the amplitude of said output oscillations.

4. The system of claim 3 in which said first filter means has a time constant greater than the period of one cycle of the lowest frequency of said modulation signals.

5. The system of claim 3 in which said means for deriving said control voltage from said first rectifier stage comprises limiter means for reducing the relative variation of said control voltage with respect to said modulation signal as the amplitude of said modulation signal increases.

6. A transmitting system comprising a source of modulation signals, a source of carrier oscillations, means for amplitude modulating said carrier oscillations with said modulation signals to provide output oscillations, means for providing a control voltage dependent upon the peak value of said signals, and means responsive to said control voltage for varying the amplitude of said output oscillations with the amplitude of said control voltage, said means providing a control voltage comprising a transformer having a primary and a tapped secondary winding, means applying said modulation signals to said primary winding, first and second rectifier circuits comprising the series connection of a first and second rectifier respectively with a first and second filter respectively, means connecting said first rectifier circuit to a tapped portion of said secondary winding, means connecting said second rectifier circuit between the ends of said secondary winding, a third rectifier connected between the junctions of said first and second rectifiers with said first and second filters with a polarity to conduct when the voltage across said second filter is less than the voltage across said first filter, said first filter having a longer time constant than said second filter, means for deriving said control voltage from the junction of said first rectifier and first filter, and means for applying said control voltage to said means for varying the amplitude of said output oscillations.

7. A stereophonic transmitting system comprising a source of first and second coherent stereophonic signals, a source of carrier oscillations, means for combining said first and second signals to provide a third signal, means for amplitude modulating said oscillations with said third signal to provide output oscillations, a source of amplitude control voltage, and means connected to said source of control voltage for varying the amplitude of said output oscillations in response to the amplitude of said control voltage, said source of control voltage comprising first and second control voltage sources connected to said sources of first and second signals respectively to provide first and second control voltages, and means for combining said first and second control voltages to provide said amplitude control voltage whereby said amplitude control voltage is equal to the greater of said first and second control voltages, each of said first and second control voltage sources comprising first and second rectifier circuits having first and second filters respectively, said first filter having a longer time constant than said second filter, rectifier means for interconnecting said first and second rectifier circuits with a polarity to conduct only when the rectified voltage of the second rectifier circuit is less than the rectified voltage of said first rectifier circuit, means applying said first and second signals to said first and second control voltage sources respectively whereby the amplitude of signals applied to the second rectifier circuits is greater than the amplitude of signals applied to said first rectifier circuits, and means deriving said first and second control voltages from the first rectifier circuits of the first and second control voltage sources respectively.

8. The system of claim 7 in which said means for combining said first and second signals comprises means for obtaining the difference between said first and second signals, whereby said third signal is a difference signal.

References Cited in the file of this patent

UNITED STATES PATENTS

| | | |
|---|---|---|
| 2,007,416 | Affel | July 9, 1935 |
| 2,032,312 | Ring | Feb. 25, 1936 |